US012071753B2

(12) United States Patent
Burris et al.

(10) Patent No.: US 12,071,753 B2
(45) Date of Patent: Aug. 27, 2024

(54) ADJUSTABLE SHOWERHEAD SUPPORT SYSTEM

(71) Applicant: RHM Innovations Inc., Rochester, NY (US)

(72) Inventors: Courtney J. Burris, Buffalo, NY (US); Zachary T. Carey, Danbury, CT (US)

(73) Assignee: RHM Innovations Inc., Rochester, NY (US)

( * ) Notice: Subject to any disclaimer, the term of this patent is extended or adjusted under 35 U.S.C. 154(b) by 123 days.

(21) Appl. No.: 17/980,657

(22) Filed: Nov. 4, 2022

(65) Prior Publication Data

US 2023/0144622 A1 May 11, 2023

Related U.S. Application Data

(60) Provisional application No. 63/276,544, filed on Nov. 5, 2021.

(51) Int. Cl.

*E03C 1/06* (2006.01)
*A47K 3/28* (2006.01)
*B05B 1/18* (2006.01)

(52) U.S. Cl.

CPC .............. *E03C 1/066* (2013.01); *A47K 3/282* (2013.01); *A47K 3/288* (2013.01); *B05B 1/185* (2013.01)

(58) Field of Classification Search

CPC .......... E03C 1/066; E03C 1/0408; E03C 1/06; A47K 3/282; A47K 3/288; B05B 1/185; B05B 1/18; B05B 15/68

See application file for complete search history.

(56) References Cited

U.S. PATENT DOCUMENTS

| | | | | |
|---|---|---|---|---|
| 4,150,445 A * | 4/1979 | Bailey | A61G 7/1003 | 4/615 |
| 6,817,045 B1 * | 11/2004 | Fainberg | A61H 35/00 | 4/606 |
| 6,842,919 B2 * | 1/2005 | Wilson | A61G 7/1003 | 4/578.1 |
| 6,912,740 B2 * | 7/2005 | Fainberg | A61H 35/00 | 4/606 |
| 9,168,193 B1 * | 10/2015 | Simi | A61G 7/0005 | |
| 2015/0208873 A1 * | 7/2015 | Tessier | A47K 3/122 | 4/615 |

* cited by examiner

*Primary Examiner* — Christine J Skubinna

(74) *Attorney, Agent, or Firm* — Stadler IP Law PLLC

(57) ABSTRACT

An adjustable showerhead support system capable of being attached to a shower chair. The showerhead support system has a showerhead support assembly operated by a showerhead support track lever allowing a user to move a showerhead forwards and backwards. The showerhead support assembly also has a telescoping bracket and telescoping legs to allow a user to adjust the height of the showerhead. The showerhead support system also includes a back track assembly operated by a back track lever that allows the user to move the showerhead left and right. The showerhead support system also includes a counterbalance.

13 Claims, 7 Drawing Sheets

ADJUSTABLE SHOWERHEAD SUPPORT SYSTEM

CROSS-REFERENCE TO RELATED APPLICATIONS

This application is a Nonprovisional Application of pending U.S. Provisional Application No. 63/276,544, filed Nov. 5, 2021, the disclosure of which is incorporated herein by reference.

FIELD OF INVENTION

This invention is directed to a showerhead support system, in particular, to an adjustable showerhead support system.

BACKGROUND OF INVENTION

A bath is one of life's simplest pleasures and a critical component of personal hygiene. Yet for some populations (e.g., the elderly or chronically ill) this is a major challenge. The purpose of a daily bath is not just cleanliness, but it also improves a person's self-image, emotional, and mental well-being, which has a direct impact on their physical well-being. Experts say that for the aging population, "losing the ability to bathe is associated with having falls, fracturing bones, and even being admitted to a nursing home." In fact, nearly a quarter million people are injured in the bathroom each year, and 70% of them are injured while bathing.

Elderly individuals have difficulty with movement, specifically being able to stand for long periods of time and raise their arms over their head. This causes issues while bathing and makes it difficult for the elderly to wash their hair and back.

Similarly, temporarily limited people (those with broken bones, pregnant women, people recovering from surgery, etc.) are unable to stand in the shower or have limited range of motion due to their 'ailment'.

For the above people, it is difficult to hold a showerhead for the duration of a shower due to weakened muscles. Showering can be messy if the flow of water is not properly contained, this is especially difficult when using a removable showerhead because there is no way to stabilize it. Moreover, some facilities don't allow people who would be otherwise independent to bathe themselves for fear of accidental strangulation with the shower hose.

To address these issues, there are currently two options on the market, (1) assisted or self-sponge bathing and (2) a stationary clip which holds the showerhead to the leg of a shower chair. Considering five categories for comparison: independence, flexibility, comfort, containment, and time saving, both current solutions are inadequate.

Sponge bathing does not offer independence, especially if it's assisted, then the person has no control over what is happening and if they do it themselves, it would be infeasible to reach their entire body. Similarly, this option does not offer flexibility as the person can only reach as much as their range of motion allows. In terms of comfort, during a sponge bath a person is exposed to the air whilst being washed, which leads to a very cold and uncomfortable experience. Additionally, sponge baths are often done in places outside of a shower, such as in a bed, which can be very messy because the water is not contained (i.e., poor containment). Lastly, bathing another person can be a time-consuming task and may require multiple people, depending upon how resistant a person is to being bathed.

A stationary clip does not enable full independence while bathing because the person is only able to reach the parts of their body which they can reach without assistance, which also means it lacks flexibility. Due to the limitations users may be facing, often times trying to wash their body, especially their back and hair, is uncomfortable and potentially painful. This also makes it difficult for the user to control the flow of water as there is nothing to stabilize the showerhead during the bathing process, which can lead to a mess. Thus, this solution does not provide containment. Lastly, the user will more than likely require assistance when using this, to get fully clean, which requires the time of multiple people.

Thus, it would be desirable to provide people with physical limitations a way to stabilize an adjustable showerhead that allows them the ability to bathe or take a shower independently.

SUMMARY OF THE INVENTION

Accordingly, it is the subject of this invention to provide a clip-on shower chair attachment with a two-lever system that moves a removable showerhead along a track, laterally, up/down and forwards/backwards, enabling independence and promoting comfort while bathing.

DETAILED DESCRIPTION OF THE INVENTION

List of Components

Showerhead support system—10
Showerhead support assembly—100
Cable track—110
First cable—**115*a***
Second cable—**115*b***
Showerhead support track—120
Showerhead support—125
Showerhead—130
Showerhead hose support—135
Showerhead hose—140
Showerhead handle—145
Showerhead handle support—150
First showerhead handle support brackets—**155*a***
Second showerhead handle support brackets—**155*b***
First showerhead support leg—**160*a***
Second showerhead support leg—**160*b***
First telescoping leg—**165*a***
Second telescoping leg—**165*b***

Showerhead support track cable—170
Telescoping bracket—175
Telescoping release lever—180
First connector—**185*a***
Second connector—**185*b***
Support bracket—190
Back track assembly—200
Upper back track—210
Lower back track—220
First support leg—**225*a***
Second support leg—**225*b***
Upper support leg connector—230
lower support leg connector—235
Two-lever assembly—300
Showerhead support track lever—305
Showerhead support track lever handle—310
Lock position 1—**310*a***
Lock position 2—**310*b***
Lock position 3—**310*c***
Showerhead support track lever connector—315
Showerhead support assembly connector—320
Back track lever handle locking button—325
Back track lever—350
Back track lever handle—355
Back track wire—360
Back track wire guide—365
Chair connection assembly—400
First chair connector—**405*a***
Second chair connector—**405*b***
Top stationary clip—410
Left bottom stationary clip—415
Right bottom stationary clip—420
Right top stationary clip—425
First counterbalance connector—**430*a***
Second counterbalance connector—**430*b***
First right counterbalance connector—**435*a***
First left counterbalance connector—**435*b***
Second right counterbalance connector—**435*cc***
Second left counterbalance connector—**435*d***
Chair—450
Counterbalance assembly—500

In one embodiment, the showerhead support system 10 helps facilitate showers for users that require a chair while showering. Showerhead support system 10 attaches to a chair 450 and provides an user with three degrees of freedom for the showerhead 130, 1) front to back, 2) telescoping or height (that is, the showerhead 130 can be moved up and down to adjust for different heights of the user), and 3) side to side or laterally. In this way, showerhead support system 10 can provide shower spray to most areas of the body.

Figure 1:
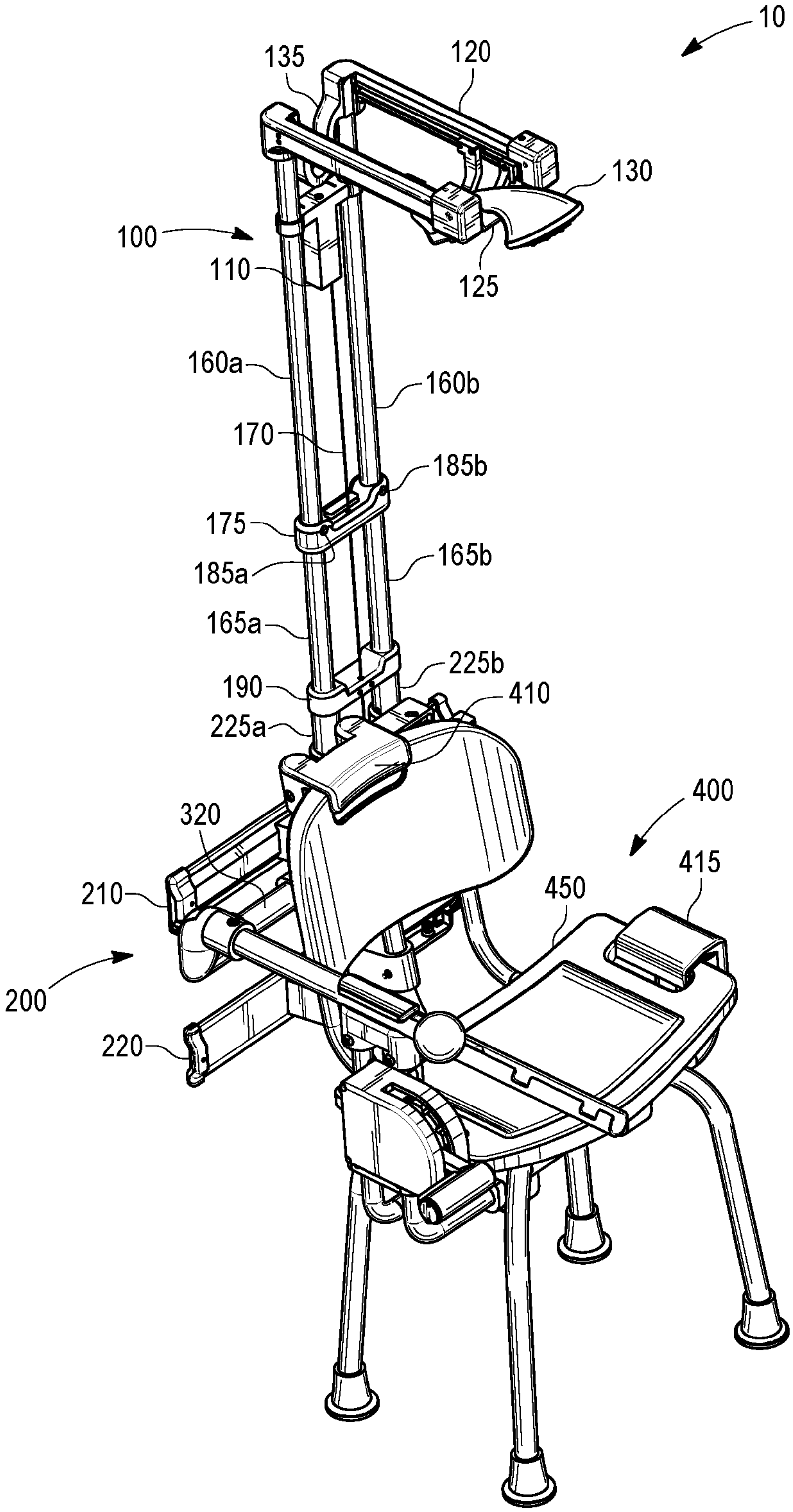
FIG. 1 depicts a perspective view of a showerhead support system.
Figure 2:
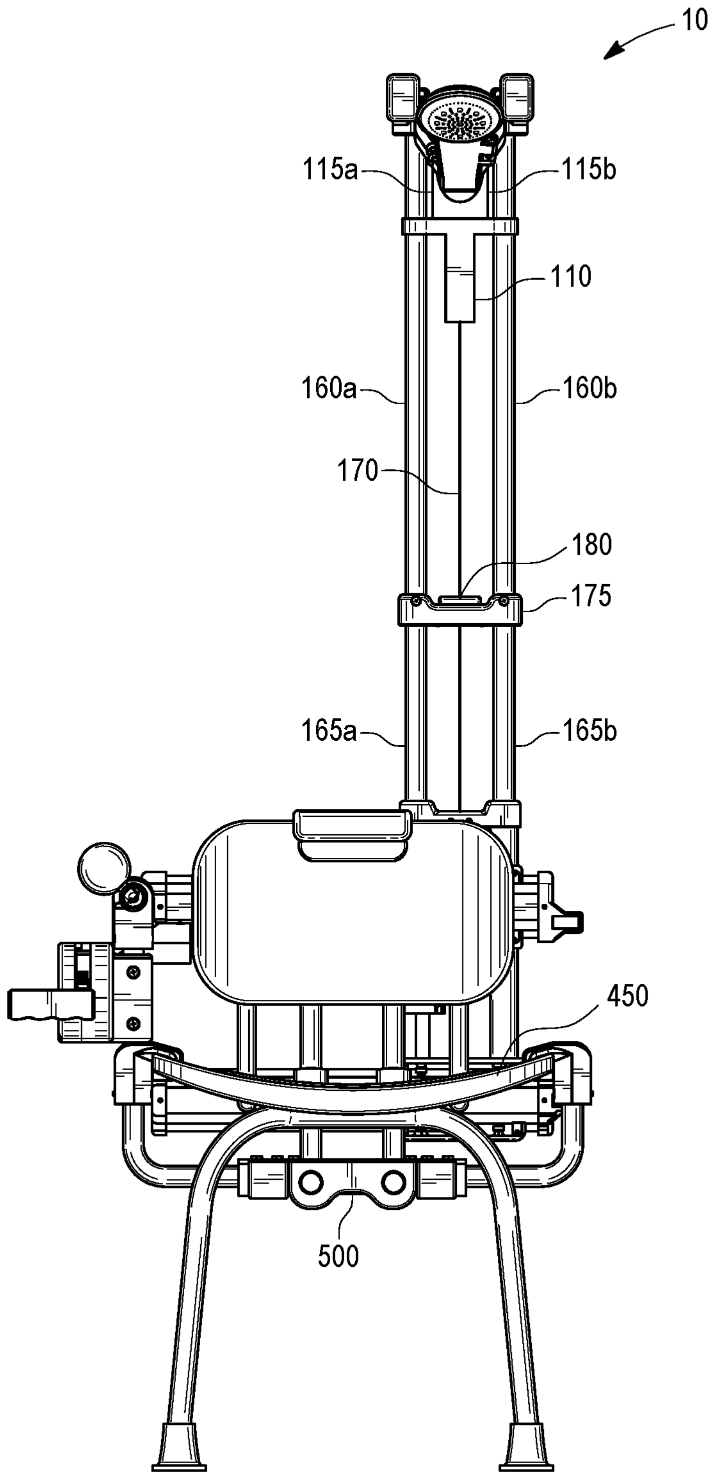
FIG. 2 depicts a front view of a shower head support system.

As shown in FIGS. 1 and 2, showerhead support assembly 100 is positioned vertically and includes cable track 110, which includes first cable **115*a* and second cable 115*b*. In one embodiment, first cable 115*a* and second cable 115*b* are attached to the top of cable track 110. Cable track 110 is embodied as T-shaped component that has openings on either side to receive first showerhead support leg 160*a* and second showerhead support leg 160*b*. At the bottom of cable track 110 is showerhead support track cable 170. Although depicted as a T-shaped component, any suitable shape will work. In one embodiment, cable track 110** is made of plastic, but it is understood that any suitable material could be used. Another suitable material is aluminum.

First cable **115*a* and second cable 115*b* travel upward from cable track 110 and through showerhead support track 120. Showerhead support track 120 is embodied as two parallel pieces connected by showerhead hose support 135 and is configured horizontally. At the back ends of both sides of showerhead support track 120, there are openings to perpendicularly receive first showerhead support leg 160*a* and second showerhead support leg 160*b*. At the front of showerhead support 120, the two parallel pieces are connected perpendicularly by showerhead support 125**.

Figure 4:
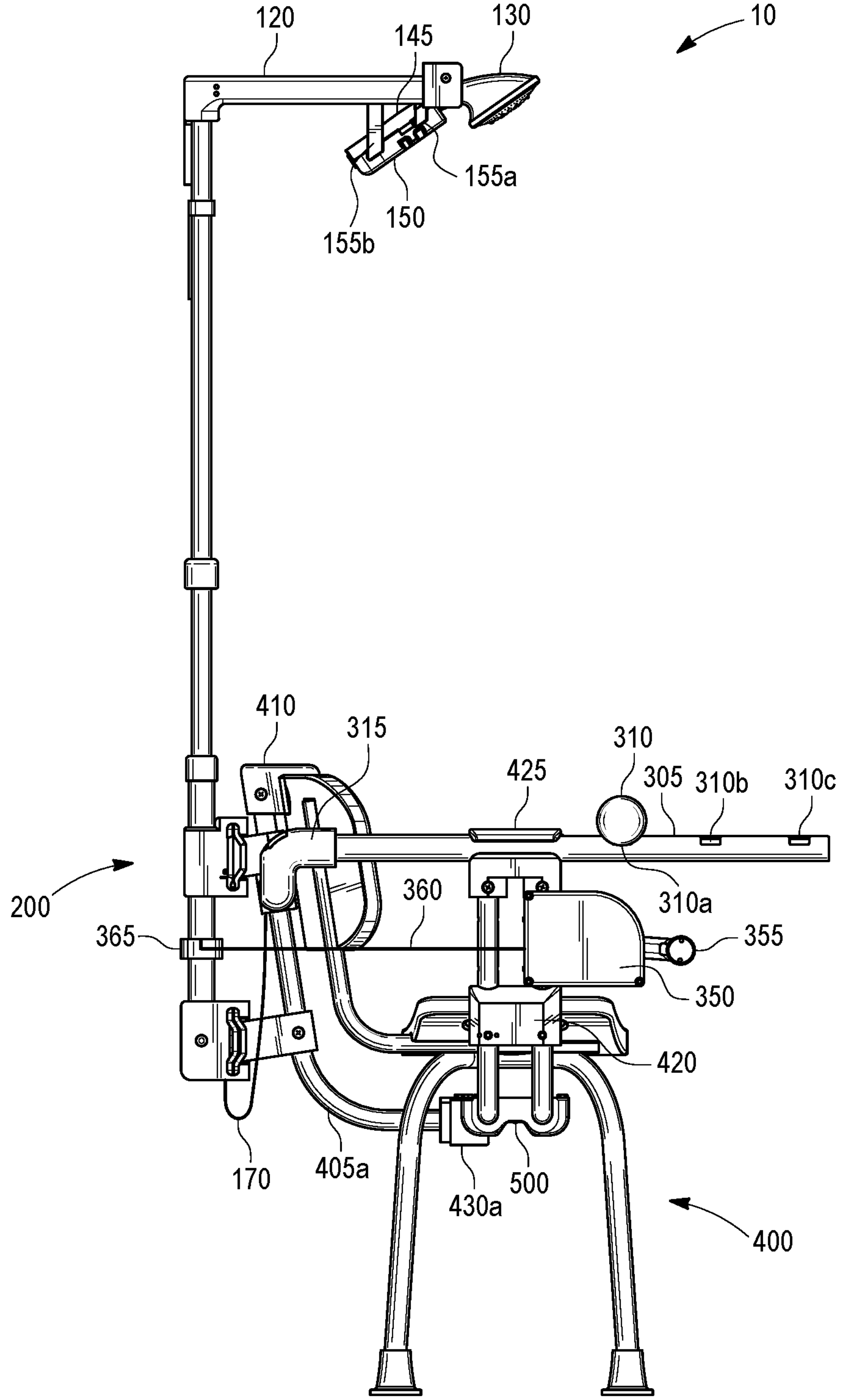
FIG. 4 depicts a right side view of a showerhead support system.
Figure 5:
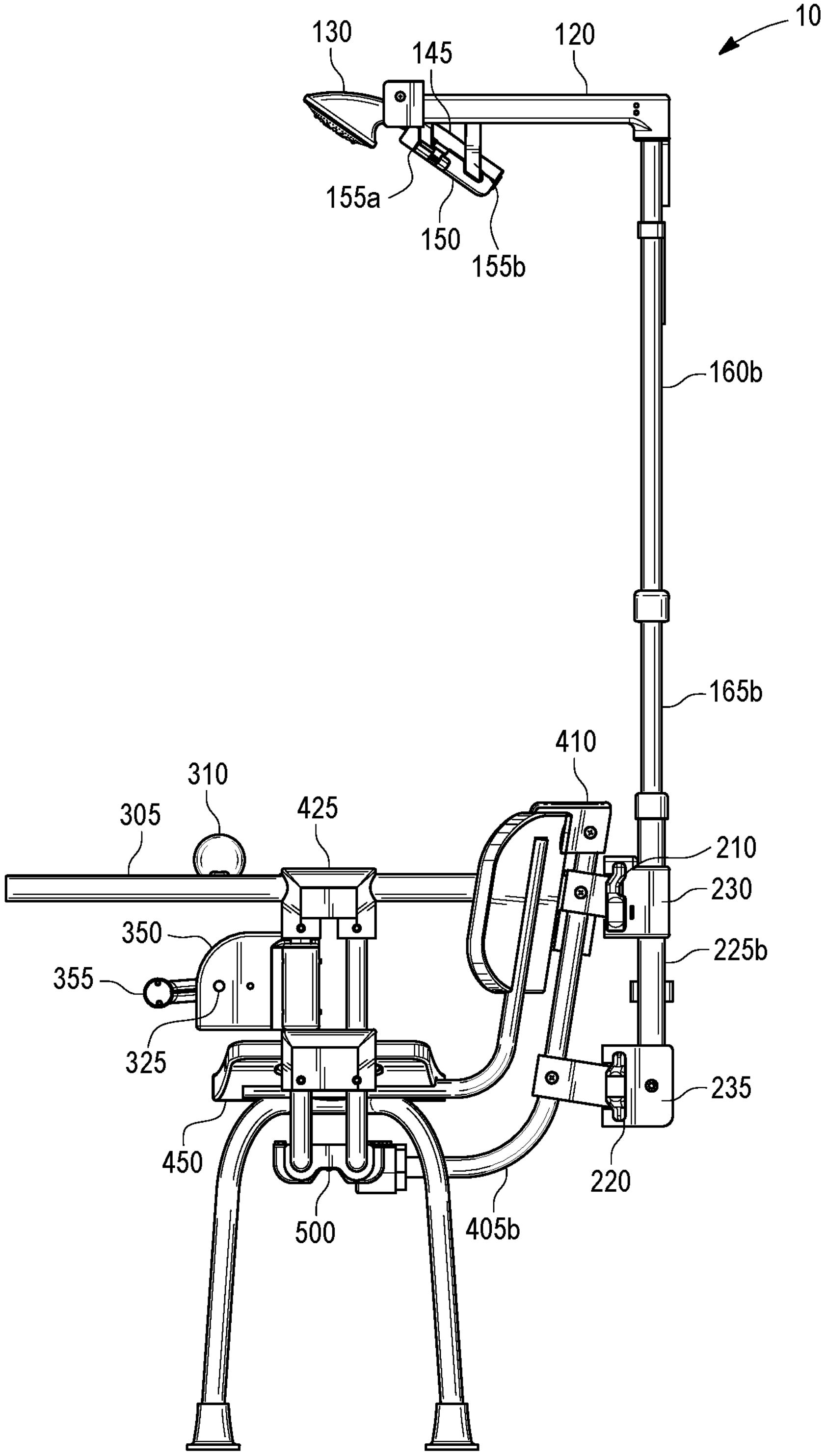
FIG. 5 depicts a left view of a showerhead support system.
Figure 7:
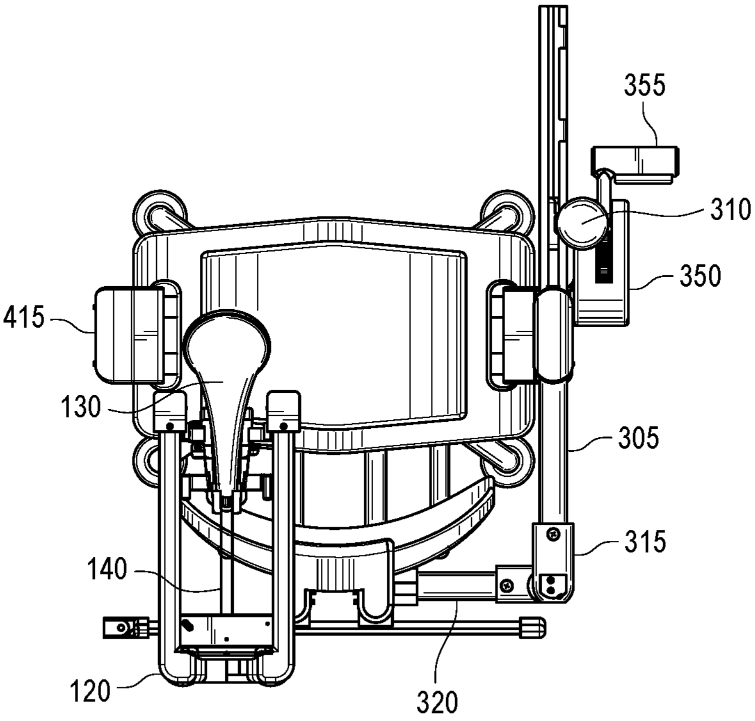
FIG. 7 depicts a top view of the a showerhead support system.

Showerhead support 125 supports showerhead 130 having showerhead handle 145 (FIGS. 4 and 5). Showerhead 130 is connected to showerhead hose 140 (FIG. 7) which is held up by showerhead hose support 135. Showerhead hose support 135 keeps showerhead hose 140 out of the user's way and prevents accidental injury (e.g., strangulation) with the showerhead hose 140. Although not depicted, showerhead hose 140 is connected a water source.

As best illustrated in side views FIGS. 4 and 5, showerhead 130 is connected to showerhead handle 145, which is supported by showerhead handle support 150. Showerhead support track 120 has first showerhead handle support brackets **155*a* and second showerhead handle support brackets 155*b* attached horizontally on either side of showerhead support track 120 and attached to showerhead handle support 150. First showerhead handle support bracket 155*a* is closer to showerhead 130 and is shorter than second showerhead handle support bracket 155*b*, which is further back from showerhead 130. Because first showerhead handle support bracket 155*a* is shorter than second showerhead handle support bracket 155*b*, showerhead handle support 150 is at an angle between 5 and 85 degrees with respect to showerhead support track 120**.

Figure 3:
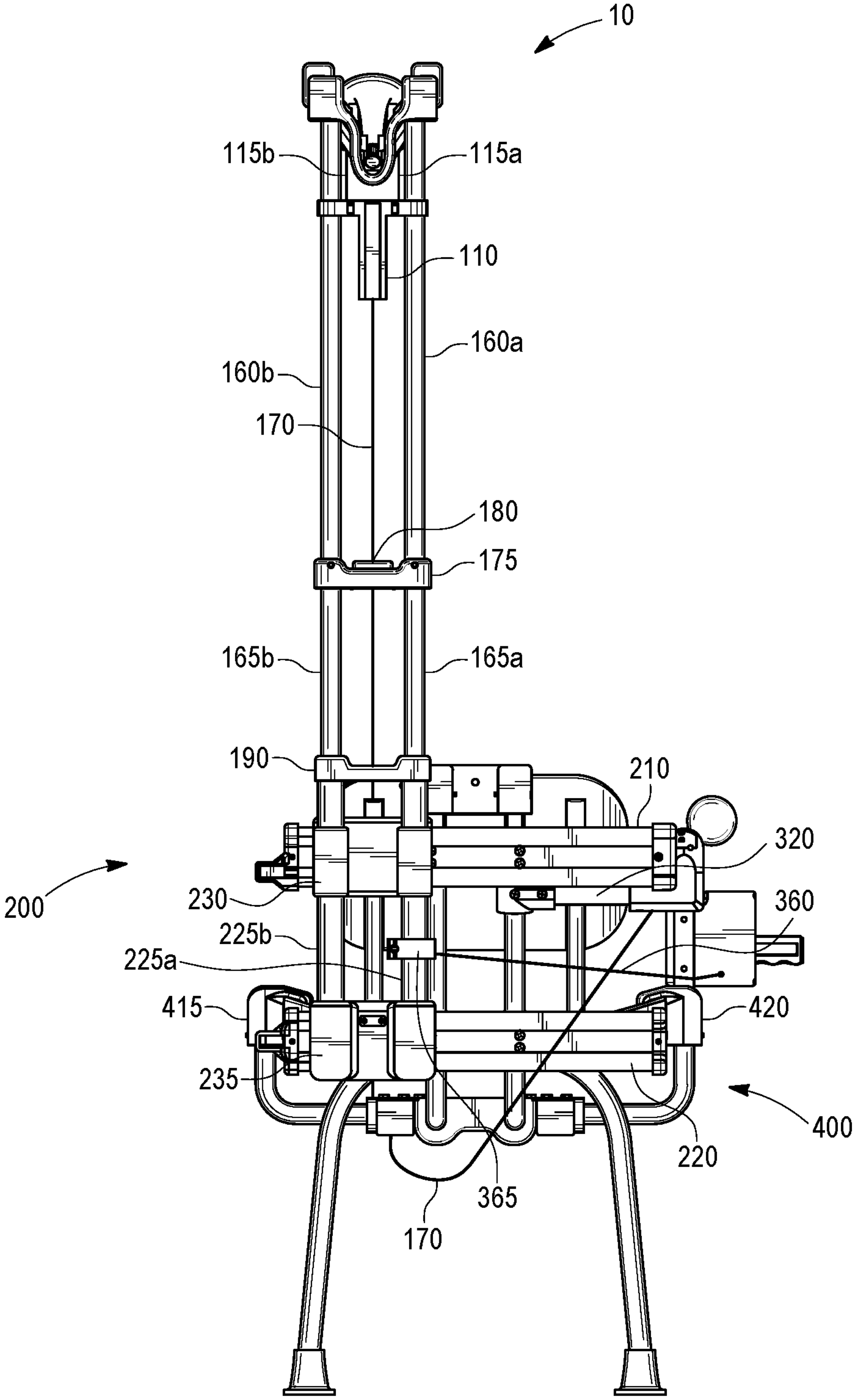
FIG. 3 depicts a rear view of s showerhead support system.

Turning to FIG. 3, showerhead 130 is capable of being moved along showerhead support track 120, which includes first and second cables **115*a*, 115*b*, that are connected to showerhead support 125, showerhead handle support 150 and first and second showerhead handle support bracket 155*a*, 155*b*. When cable track 110 is raised or lowered, first and second cables 115*a*, 115*b*, provide the first degree of freedom 1) front to back. That is, if cable track 110 is lowered, then showerhead 130 will move back towards the back of the user (and closer to the water source) and if cable track 110 is raised, then showerhead will move forward towards the front of the user (and further away from the water source). As cable track 110 is raised or lowered, showerhead support 125, showerhead handle support 150 and first and second showerhead handle support bracket 155*a*, 155*b* all move along showerhead support track 120. Cable track 110 is raised or lowered by showerhead support track cable 170, which is moved by showerhead support track lever 305** and this is described below.

Also shown in FIG. 3, first and second showerhead support legs **160*a*, 160*b*, are connected to first and second telescoping legs 165*a*, 165*b*, by way of telescoping bracket 175, which has openings at the top for receiving first and second showerhead support legs 160*a*, 160*b*, and openings at the bottom for receiving first and second telescoping legs 165*a*, 165*b*. Telescoping bracket 175 is further secured to first and second showerhead support legs 160*a*, 160*b*, by way of first and second connectors 185*a*, 185*b***.

First and second showerhead support legs **160*a*, 160*b*, have a larger diameter than first and second telescoping legs 165*a*, 165*b*. Telescoping bracket 175 includes telescoping release lever 180, which impinges on first and second telescoping legs 165*a*, 165*b*, such that first and second showerhead support legs 160*a*, 160*b*, are prevented from sliding over first and second telescoping legs 165*a*, 165*b*. When pressure is applied to telescoping release lever 180, it disengages first and second telescoping legs 165*a*, 165*b***, thereby allowing first and second showerhead support legs 160*a*, 160*b*, to slide over first and second telescoping legs 165*a*, 165*b*. Once the desired height is reached, pressure can be released from telescoping release lever 180 so that is again impinges on first and second telescoping legs 165*a*, 165*b*, thereby preventing first and second showerhead support legs 160*a*, 160*b*, from moving.

Thus, telescoping bracket provides the second degree of freedom 2) telescoping or height. By adjusting the placement of first and second showerhead support legs 160*a*, 160*b*, with respect to first and second telescoping legs 165*a*, 165*b*, the showerhead 130 will be positioned to the desired height for any individual using the showerhead support system 10.

First and second telescoping legs 165*a*, 165*b*, are also connected to first and second support legs 225*a*, 225*b* by way of support bracket 190, which has openings at the top for receiving receiving first and second telescoping legs 165*a*, 165*b* openings at the bottom for receiving first and second support legs 225*a*, 225*b*.

Below support bracket 190, upper and lower support leg connectors 230, 235, both have openings at the top to receive first and second support legs 225*a*, 225*b*. Additionally, upper support leg connector 230 has openings at the bottom such that first and second support legs 225*a*, 225*b*, can be threaded through and then end at lower support leg connector 235.

In addition to providing support for first and second support legs 225*a*, 225*b*, upper and lower support leg connectors 230, 235, connect to upper and lower back tracks 210, 220, thereby forming back track assembly 200. Ultimately, back track assembly 200 provides the third degree of freedom, 3) side to side movement, which allows showerhead 30 to move side to side.

Upper and lower back tracks 210, 220, are configured to allow upper and lower support leg connectors 230, 235, respectively to slide left to right. Upper and lower back tracks 210, 220, may be straight across or may be curved. On either the front or back side of upper and lower back tracks 210, 220, there are tracks or slots for upper and lower support leg connectors 230, 235, to engage or interlock with such that the showerhead support assembly 100 may be moved left or right. Upper Although the FIGS. all depict back track assembly 200 located in front of shower support assembly 100 with respect to chair 450, in other embodiments, back track assembly 200 may be located behind shower support assembly 100. As will be discussed below, the left to right location of showerhead support assembly 100 may be locked in place.

FIG. 4 depicts a right side view of showerhead support system 10 and back track assembly 200, while FIG. 5 depicts a left side view. As can be seen, upper and lower back tracks 210, 220, are further configured to connect to first and second chair connectors 405*a*, 405*b*, thereby forming chair connection assembly 400. First and second chair connectors 405*a*, 405*b*, are connected to the top of chair 450 by way of top stationary clip 410 and both connectors angle down towards the bottom of chair 450 and then curve in under the seat of chair 450 to connect to counterbalance assembly 500 by way of first and second counterbalance connectors 430*a*, 430*b*. Also shown are left and right bottom stationary clips 415, 420, which connect counterbalance assembly 500 to the left and right side of the seat of chair 450, respectively, by way of first right, first left, second right, second left counterbalance connectors 435*a*, 435*b*, 435*c*, 435*d*, (FIG. 6).

Figure 6:
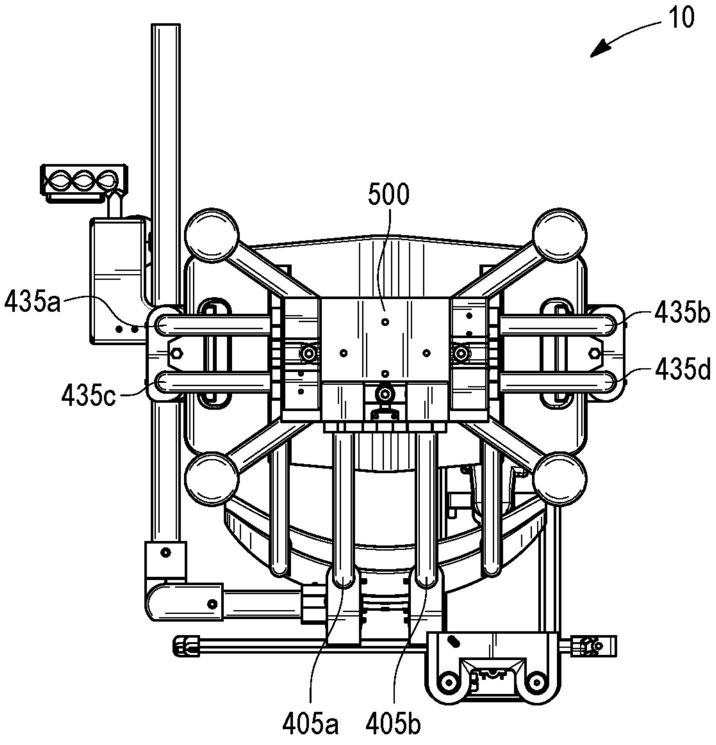
FIG. 6 depicts a bottom view of a showerhead support system.

FIG. 6 best illustrates counterbalance assembly 500 and first right, first left, second right, second left counterbalance connectors 435*a*, 435*b*, 435*c*, 435*d*. These connectors are attached to counterbalance assembly 500 and extend horizontally therefrom towards either the right or left side of the seat of chair 450 and then curve upwards in order to connect to left bottom stationary clip 415 or right bottom stationary clip 42. In the case of first and second right counterbalance connectors 435*a*, 435*c*, these connectors travel through right bottom stationary tip 420 and continue upwards and end at right top stationary clip 425. Left bottom, right bottom, and right top stationary clips 415, 420, 425, all have openings to allow the connectors to connect.

Counterbalance assembly 500 provides a counterbalance to showerhead support system 10 by lowering the center of gravity such that showerhead support system 10 does not cause chair 450 to fall over. Counterbalance assembly 500 is any combinations of weights that is suitable to offset the weight of showerhead support system 10.

As further described below, two-lever assembly 300 includes showerhead support track lever 305 and back track lever 350, which make it easier to control the motion of showerhead 130 and control of the flow of water. The levers are connected to pulleys that help control the motion of the system. The two-lever assembly 300 is connected to low force springs that will provide low resistance but still bring the motion systems back to their original positions. Although not depicted, two-lever assembly 200 may be placed on the left side of chair 450 to allow anyone to use the levers with the dominate arm and to accommodate different shower spaces.

As seen in FIGS. 1 and 4, right top stationary clip 425 is configured such that it can accommodate a horizontally positioned showerhead support track lever 305. Showerhead support track lever 305 is connected to showerhead support track lever connector 315, which is configured to connect to showerhead support assembly connector 320, which perpendicularly connects showerhead support track lever 305 to showerhead support assembly 100 or chair 450.

Showerhead support track lever 305 has an attached showerhead support track lever handle 310. In one embodiment, back track lever handle 310 is embodied as a handle with a ball on top for users with arthritis and joint discomfort so it will be easier for them to grip. Optionally, multiple back track lever handles may be designed to be interchanged dependent upon user need.

Showerhead support track lever 305 and showerhead support track lever handle 310 are connected to showerhead support track cable 170 as best seen in FIG. 4. As showerhead support track lever handle 310 is moved, showerhead support track cable 170 is either pulled or let loose, causing cable track 110 to move up or down. Cable track 110 then moves both first and second cables 115*a*, 115*b*, along showerhead support track, thereby moving showerhead 130 forwards or backwards.

In a preferred embodiment, showerhead support track lever 305 also has openings to lock in showerhead support track lever handle 310. Starting closest to the back of chair 450, showerhead support track lever 305 includes showerhead support track lever handle lock positions 1, 2, 3, 310*a*, 310*b*, and 310*c*, respectively. This will then adjust the showerhead in three main positions, in front of the user's head, above the user's head, and behind the user's head, respectively.

Also shown in FIG. 4, back track lever 350 includes back track lever handle 355. As best seen in FIG. 3, back track wire 360 is connected to back track lever handle 355 and back track wire guide 365, which is connected to first support leg 225*a*. As can be imagined, when back track lever handle 310 is moved backward with respect to chair 450, back track wire 360 is loose with respect to back track wire guide 365 allowing back track assembly 200 to be to the left side of chair 450. When back track lever handle 310 is moved forward, back track wire 360 is taut with respect to back track wire guide 365 and back track assembly 200 will move to the right side of chair 450. Back track handle 310 may be moved to any position between complete backward and complete forward and the location of back track assembly 200 will follow.

As described above, upper back track 210 and lower back track 220 are both configured with tension coils that extend along the upper and lower back tracks 210, 220 if back track lever handle 355 is moved forward. Alternatively, the tension coils wrap inside of upper and lower back tracks 210, 220, as back track lever handle 355 is moved backward. In this way, back track assembly 200 is able to move side to side.

In one embodiment, back track lever handle 355 may include a discrete locking mechanism, such as a back track lever handle locking button 325, which may be configured as push button locking mechanism (FIG. 5).

Features of the Invention

In a preferred embodiment, the showerhead support system 10 clips to the seat of the shower chair, rather than to the back of the shower chair, thereby fitting a wider range of shower chairs. It is noted that all shower chairs have seats/benches, but not all shower chairs have backs.

In one embodiment, the back track assembly 200 is curved to allow a wider range of motion, i.e., to enable a user to reach the sides and front of their body, even their legs and feet. This also saves on space to allow the showerhead support system 10 to be used in smaller showers.

In another embodiment, there is a clip (not shown) that holds showerhead 130 in place to stabilize it during the bathing process, which reduces the mess and increases user control. The clip has multiple angles in which it can be set, adding another degree of freedom.

As described above, the two-lever assembly 300 makes it easier to control the motion of the showerhead and the flow of water. The levers are connected to pulleys that help control the motion of the system. These lever systems are connected to low force springs that will provide low resistance but still bring the motion systems back to their original positions. By locking the moving parts of the apparatus the user has greater control of water flow. By adding easy to use locking mechanisms, the user can position the showerhead where they want and not have to worry about additional physical strain of controlling the water flow.

Optional Features of the Disclosure

In one embodiment feet may be attached to the bottom of the showerhead support system 10, thereby providing it with more stability when necessary.

Materials and Construction

In most embodiments, showerhead support system 10 will be constructed mainly out of plastic and metal, mostly aluminum. It is noted that any suitable material may be used to make the various components of showerhead support system 10.

The connectors will be mostly constructed from molded plastics except for the connectors that connect directly to the chair. Those connectors will be fabricated in aluminum to ensure a strong rigid mount while also keeping the overall system lightweight and corrosion resistant. The connectors themselves will be covered with a rubber insulation to both help with the grip onto the surface while also making it a more comfortable surface for the user when they sit on it.

Optionally a hose guard may be provided and will be originally molded out of polycarbonate plastic. It is noted that the optional hose guard may be made of sheet metal.

The back track assembly 200 will be initially manufactured out of aluminum but could be changed to plastic later if it is determined that the track can handle the forces. This would make the showerhead support system 10 more lightweight.

The showerhead clip will be prefabricated and be mostly created out of plastic except for the eyebolts that are used to connect the cabling from the pulleys to the showerhead clip.

The two-lever assembly 300 will be aluminum to ensure a strong, rigid connection to the cable and pulley system. They will be covered in a rubber over mold to make the surface softer and more user friendly.

Key and Distinguishing Features

The features of showerhead support system 10 provide its users with independence, flexibility, comfort, containment, while saving time. In terms of independence and flexibility, showerhead support system 10 has multiple degrees of freedom (flexibility) and a low resistance lever system which enables the user to shower without assistance, except potentially setting the chair and shower up. Showerhead support system 10 puts less strain on the individual and allows them to stay in the warm water for the duration of the bathing process, which provides a more comfortable and pleasurable bathing experience. The combination of showerhead holster and hose guard ensure that the flow of water is controlled and thus contained. Showerhead support system 10 promotes independence while bathing making it more pleasurable and eliminating the need for assistance, which ultimately saves time.

Alternative Embodiments

In an alternative embodiment, the levers can be placed on either the right or left side of the chair to allow anyone to use the levers with the dominate arm and to accommodate different shower spaces. Additionally, there is a locking mechanism for each lever, which holds the showerhead in a fixed position for comfort and ease of use.

In one alternative embodiment, the chair could come configured with showerhead support system 10 instead of making it a clip. This could also help eliminate a lot of potential issues with attaching the device to other chairs.

It will be appreciated by those skilled in the art that while the showerhead support system 10 has been described in detail herein, the invention is not necessarily so limited and other examples, embodiments, uses, modifications, and departures from the embodiments, examples, uses, and modifications may be made without departing from the process and all such embodiments are intended to be within the scope and spirit of the appended claims.

What is claimed is:

1. A shower support system comprising:

a shower support assembly including a first and a second showerhead support leg arranged parallel to one another and positioned vertically;

the first and second showerhead support legs are connected by a telescoping bracket having recesses defined on the top and on either side such that it is capable of receiving the bottoms of first and second showerhead support legs and wherein telescoping bracket is positioned horizontally and is arranged perpendicularly to the first and second showerhead support legs;

a cable track having recesses defined on either side such that it is capable of receiving the first and second showerhead support legs therethrough and positioned horizontally and is arranged perpendicularly to the first and second showerhead support legs and is located above telescoping bracket;

the cable track further includes a showerhead support track cable extending from the bottom and a first and a second showerhead cable extending from either side of the top;

a showerhead support track having recesses defined on the bottom and on either side such that it is capable of receiving the tops of first and second showerhead support legs and wherein the showerhead support track is positioned horizontally and is arranged perpendicularly to the first and second showerhead support legs extending forward therefrom and is located above the cable track;

showerhead support track is further configured to guide first and second showerhead cables and further includes a first showerhead handle support bracket on each side and second shower showerhead handle support bracket on each side and wherein the first and second showerhead handle support brackets are located at the bottom of showerhead support track and are connected to either of first and second showerhead cable;

a showerhead handle support that is connected to the bottom of both first showerhead handle support brackets and is also connected to the bottom of both second showerhead handle support brackets such that showerhead support handle is suspended and is capable of supporting a handle of a showerhead;

a first and a second telescoping leg arranged parallel to one another and positioned vertically and located below the first and second showerhead support legs and telescoping bracket and connected at the top to the telescoping bracket by way of recesses defined on either side of the bottom of telescoping bracket such that it is capable of receiving the first and second telescoping legs;

a support bracket having recesses defined on the top and on either side such that it is capable of receiving the bottoms of first and second telescoping legs and having recesses defined on the bottom on either side such that it is capable of receiving a first and a second support leg and positioned horizontally and is arranged perpendicularly to the first and second telescoping legs and the first and second support legs;

first and second support legs are further arranged parallel to one another and positioned vertically and located below the first and second telescoping legs;

an upper and lower support leg connector arranged parallel to each other and positioned horizontally and located below support bracket and having recesses defined on the top and on either side such that they are capable of receiving the bottoms of first and second support legs and wherein the recess of upper support leg connector allows first and second support legs to continue therethrough and continue to the lower support leg connector;

a back track assembly including an upper and a lower back track arranged parallel to one another and connected to upper or lower support leg connector and are capable of allowing showerhead support assembly to slide left and right and wherein both upper and lower back track are positioned horizontally and perpendicular to the upper and lower support legs;

a chair connection assembly including a top stationary clip capable of being attached to the back of a chair and having recesses defined such that a first and a second chair connector may be received on either side of top stationary clip;

first and second chair connectors extend downwards and curve under to connect to a first and a second counterbalance connector both of which have recesses defined for receiving first and second chair connectors;

chair connection assembly further includes a right bottom stationary clip capable of being connected to an arm of a chair and having recesses defined such that a first right and a second right counterbalance connecter may be received and a left bottom stationary clip having recesses defined such that a first left and a second left counterbalance connector may be received, first right, second right, first left, second left counterbalance connectors extend from right and left bottom stationary clips and travel downwards and curve under;

a counterbalance assembly including a weight capable of being connected to a bottom of a chair and to first and second counterbalance connectors, and first right, second right, first left, and second left connectors;

a two-lever assembly including a back track lever having a handle and a showerhead support track lever having a handle;

first right and second right counterbalance connectors further extend through right bottom stationary clip and at right top stationary clip which has recesses defined for receiving first right and second right counterbalance connectors and has a recess defined such that it is capable of receiving showerhead support track lever, which is positioned horizontally;

showerhead support track lever further includes showerhead support track lever handle and is connected to showerhead support assembly connector which has a recess defined such that it receives showerhead support track lever and is configured to connect to showerhead support assembly connector which is capable of being connected to a chair;

showerhead support track lever is connected to showerhead support track cable and showerhead support track lever handle is capable of moving showerhead support track cable which is capable of moving showerhead support assembly forwards and backwards;

back track lever is connected to first right counterbalance connector at a location between right bottom stationary clip and right top stationary clip; and back track lever includes a back track lever handle located at the front and a back track wire located at the back and back track wire is connected to a back track wire guide which connects to first support leg and wherein back track lever handle may be moved forwards or backwards and is capable of moving the backtrack assembly left or right.

2. The showerhead support system of claim 1, further including showerhead hose support at the back of showerhead support track and configured to receive a showerhead hose.

3. The showerhead support system of claim 1, wherein the first showerhead handle support brackets are shorter than second showerhead handle support brackets such that showerhead handle support is at an angle slowing downwards from the front of showerhead support track.

4. The showerhead support system of claim 1, wherein the first and second telescoping legs have a smaller diameter than the first and second showerhead support legs such that when telescoping release lever is released, first and second showerhead support legs are capable of sliding over first and second telescoping legs.

5. The showerhead support system of claim 4, wherein the telescoping bracket impinges on first and second telescoping legs such that first and second showerhead support legs are not able to move over first and second telescoping legs unless telescoping release lever is released.

6. The showerhead support system claim 1, wherein upper and lower back track are straight across.

7. The showerhead support system claim 1, wherein upper and lower back track are curved.

8. The showerhead support system of claim 1, wherein the upper and lower back track are connected to upper or lower support leg connector by an interlocking mechanism such that showerhead support assembly is capably of sliding along upper and lower back track.

9. A shower support system comprising:

a shower support assembly including a first and a second showerhead support leg arranged parallel to one another and positioned vertically;

the first and second showerhead support legs are connected by a telescoping bracket having recesses defined on the top and on either side such that it is capable of receiving the bottoms of first and second showerhead support legs and wherein telescoping bracket is positioned horizontally and is arranged perpendicularly to the first and second showerhead support legs;

a cable track having recesses defined on either side such that it is capable of receiving the first and second showerhead support legs therethrough and positioned horizontally and is arranged perpendicularly to the first and second showerhead support legs and is located above telescoping bracket;

the cable track further includes a showerhead support track cable extending from the bottom and a first and a second showerhead cable extending from either side of the top;

a showerhead support track having recesses defined on the bottom and on either side such that it is capable of receiving the tops of first and second showerhead support legs and wherein the showerhead support track is positioned horizontally and is arranged perpendicularly to the first and second showerhead support legs extending forward therefrom and is located above the cable track;

showerhead support track is further configured to guide first and second showerhead cables and further includes a first showerhead handle support bracket on each side and second shower showerhead handle support bracket on each side and wherein the first and second showerhead handle support brackets are located at the bottom of showerhead support track and are connected to either of first and second showerhead cable;

a showerhead handle support that is connected to the bottom of both first showerhead handle support brackets and is also connected to the bottom of both second showerhead handle support brackets such that showerhead support handle is suspended and is capable of supporting a handle of a showerhead;

a first and a second telescoping leg arranged parallel to one another and positioned vertically and located below the first and second showerhead support legs and telescoping bracket and connected at the top to the telescoping bracket by way of recesses defined on either side of the bottom of telescoping bracket such that it is capable of receiving the first and second telescoping legs;

a support bracket having recesses defined on the top and on either side such that it is capable of receiving the bottoms of first and second telescoping legs and having recesses defined on the bottom on either side such that it is capable of receiving a first and a second support leg and positioned horizontally and is arranged perpendicularly to the first and second telescoping legs and the first and second support legs;

first and second support legs are further arranged parallel to one another and positioned vertically and located below the first and second telescoping legs;

an upper and lower support leg connector arranged parallel to each other and positioned horizontally and located below support bracket and having recesses defined on the top and on either side such that they are capable of receiving the bottoms of first and second support legs and wherein the recess of upper support leg connector allows first and second support legs to continue therethrough and continue to the lower support leg connector;

a chair connection assembly including a top stationary clip capable of being attached to the back of a chair and having recesses defined such that a first and a second chair connector may be received on either side of top stationary clip;

first and second chair connectors extend downwards and curve under to connect to a first and a second counterbalance connector both of which have recesses defined for receiving first and second chair connectors;

chair connection assembly further includes a right bottom stationary clip capable of being connected to an arm of a chair and having recesses defined such that a first right and a second right counterbalance connecter may be received and a left bottom stationary clip having recesses defined such that a first left and a second left counterbalance connector may be received, first right, second right, first left, second left counterbalance connectors extend from right and left bottom stationary clips and travel downwards and curve under;

a counterbalance assembly including a weight capable of being connected to a bottom of a chair and to first and second counterbalance connectors, and first right, second right, first left, and second left connectors; and, first right and second right counterbalance connectors further extend through right bottom stationary clip and at right top stationary clip which has recesses defined for receiving first right and second right counterbalance connectors and has a recess defined such that it is capable of receiving showerhead support track lever, which is positioned horizontally.

10. The showerhead support system of claim 9, further including showerhead hose support at the back of showerhead support track and configured to receive a showerhead hose.

11. The showerhead support system of claim 9, wherein the first showerhead handle support brackets are shorter than second showerhead handle support brackets such that showerhead handle support is at an angle slowing downwards from the front of showerhead support track.

12. The showerhead support system of claim 1, wherein the first and second telescoping legs have a smaller diameter than the first and second showerhead support legs such that when telescoping release lever is released, first and second showerhead support legs are capable of sliding over first and second telescoping legs.

13. The showerhead support system of claim 12, wherein the telescoping bracket impinges on first and second telescoping legs such that first and second showerhead support legs are not able to move over first and second telescoping legs unless telescoping release lever is released.

* * * * *